United States Patent
Sthanikam et al.

(10) Patent No.: US 8,082,493 B2
(45) Date of Patent: Dec. 20, 2011

(54) STREAMING XML PATCH

(75) Inventors: Balasubramanyam Sthanikam, Foster City, CA (US); Nipun Agarwal, Santa Clara, CA (US); Ravi Murthy, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1307 days.

(21) Appl. No.: 11/401,609

(22) Filed: Apr. 10, 2006

(65) Prior Publication Data

US 2007/0240034 A1    Oct. 11, 2007

(51) Int. Cl.
*G06F 17/27* (2006.01)

(52) U.S. Cl. ........................................... 715/234

(58) Field of Classification Search ............. 715/234
See application file for complete search history.

(56) References Cited

U.S. PATENT DOCUMENTS

| | | | |
|---|---|---|---|
| 6,260,042 B1 | 7/2001 | Curbera et al. | |
| 6,374,207 B1 * | 4/2002 | Li et al. ............. | 703/27 |
| 6,377,957 B1 | 4/2002 | Jeyaraman | |
| 6,836,778 B2 * | 12/2004 | Manikutty et al. ........... | 707/102 |
| 7,103,838 B1 | 9/2006 | Krishnamurthy et al. | |
| 7,260,773 B2 | 8/2007 | Zernik | |
| 7,523,119 B2 * | 4/2009 | Imamura et al. ............. | 707/101 |
| 7,735,144 B2 | 6/2010 | Pravetz et al. | |
| 2003/0041304 A1 | 2/2003 | Numata et al. | |
| 2003/0237049 A1 * | 12/2003 | Sawicki et al. ............. | 715/513 |
| 2004/0044965 A1 * | 3/2004 | Toyama et al. ............. | 715/523 |
| 2004/0216086 A1 * | 10/2004 | Bau ............................ | 717/114 |
| 2004/0230891 A1 | 11/2004 | Pravetz et al. | |
| 2005/0256893 A1 | 11/2005 | Perry | |
| 2005/0267885 A1 | 12/2005 | Klier | |
| 2006/0218160 A1 * | 9/2006 | Bhatia ......................... | 707/100 |
| 2006/0265593 A1 | 11/2006 | Momma et al. | |
| 2007/0240035 A1 | 10/2007 | Sthanikam et al. | |

OTHER PUBLICATIONS

"An Extensible Markup Language (XML) Patch Operations Framework Utilizing XML Patch Language (XPath) Selectors" retrieved on Jun. 29, 2006 from the Internet<URL: http://www.ieft.org/internet-drafts/draft-ietf-simple-xml-patch-ops-02.txt > (pp. 1-21).

"Streaming API For XML JSR-173 Specification" *BEA Systems, Inc.* (2003) 61 pages.

Komvoteas, "XML Diff and Patch Tool" (2003) 26 pages.

* cited by examiner

*Primary Examiner* — Laurie Ries
*Assistant Examiner* — Tionna Smith
(74) *Attorney, Agent, or Firm* — Hickman Palermo Truong & Becker LLP; Daniel D. Ledesma

(57) ABSTRACT

A technique for differencing XML documents is provided. An edit graph is generated for computing the cost of possible edits that may be applied to a first XML document in order to generate a second XML document. A hash value is assigned to nodes included in the axes of the edit graph, where one axis includes nodes in the first XML document and the other axis includes nodes in the second XML document. The hash value may be generated based on a particular node's name and attributes, and the hash value of the name and attributes of each child node of the particular node. A technique for patching an XML document is also provided. Events are generated for each node in the input document and for at least one operation specified in the edit script. The edit script is applied to the input document by performing one or more operations specified in the operation events on one or more node events.

20 Claims, 7 Drawing Sheets

STREAMING XML PATCH

FIELD OF THE INVENTION

The present invention relates to XML documents, and more particularly to efficiently determining the differences between two related XML documents.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The XML (extensible Markup Language) specification established by the W3C Organization provides a standardized methodology for exchanging structured data between different mechanisms. The different mechanisms may be different components within the same system (e.g. different program components) or they may be completely separate systems (e.g. systems of different companies, or different servers on the World Wide Web). Basically, XML allows structured data to be exchanged in a textual format using "element tags" to specify structure and to delimit different sets of data.

XML documents comprise one or more elements determined by tags. Elements may be nested within other elements to give rise to a hierarchical structure, which defines the structural relationships between the various elements. Because they specify a hierarchical structure, XML documents lend themselves to being represented by tree-type representations. In fact, many XML documents are not processed directly but rather are first parsed and transformed into tree representations, and then processed using the tree representations.

An XML document may be represented using any type of tree structure, but one tree structure that is commonly used is the one provided by the document object model (DOM). More specifically, an XML document may be parsed into objects using the DOM, and the resulting DOM tree represents the parsed document as a node tree with a plurality of nodes. The DOM provides a rich tree representation for the XML document. Given any node on the tree, the DOM tree representation provides all information pertinent to that node. For example, the DOM tree provides information as to which node is the parent of that node, which nodes are children of that node, and which nodes are siblings of that node. Given this information, it can be easily determined where a particular node fits within the XML document. More information and a specification for the DOM can be found on the W3C website at www.w3c.org.

Whenever storing XML documents, there is a frequent need for detecting changes between versions of documents. Thus, a common need is determining the changes that have occurred to a document since a previous version of a document.

A common differencing (i.e. "diffing") tool is one provided by UNIX. While UNIX diff works sufficiently for normal text documents, it does not understand the tree structure involved in XML. Therefore, it can not find a minimal and correct (in the sense of XML) edit script between two XML documents. An edit script specifies transformation operations that, when applied to an input document, transform the input document into an output document. A minimal edit script is one in which there are no other edit scripts in the set of all possible edit scripts with less operations that, when applied to the same input document, produce the same output document.

Current approaches for diffing XML documents use too many resources and are relatively slow. Therefore, there is a need to provide a more efficient way for diffing two XML documents.

Once an edit script is generated, the edit script may be applied to a XML document (i.e. "patching a document") in order to generate a patched version of the XML document. If an operation (e.g. insert, delete, rename) in the edit script identifies a node in the (un-patched) XML document, then the operation is performed and the patched XML document will reflect the modification identified in the operation.

Current approaches for patching an XML document require a significant amount of resources. Therefore, there is a need to more efficiently patch an XML document.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
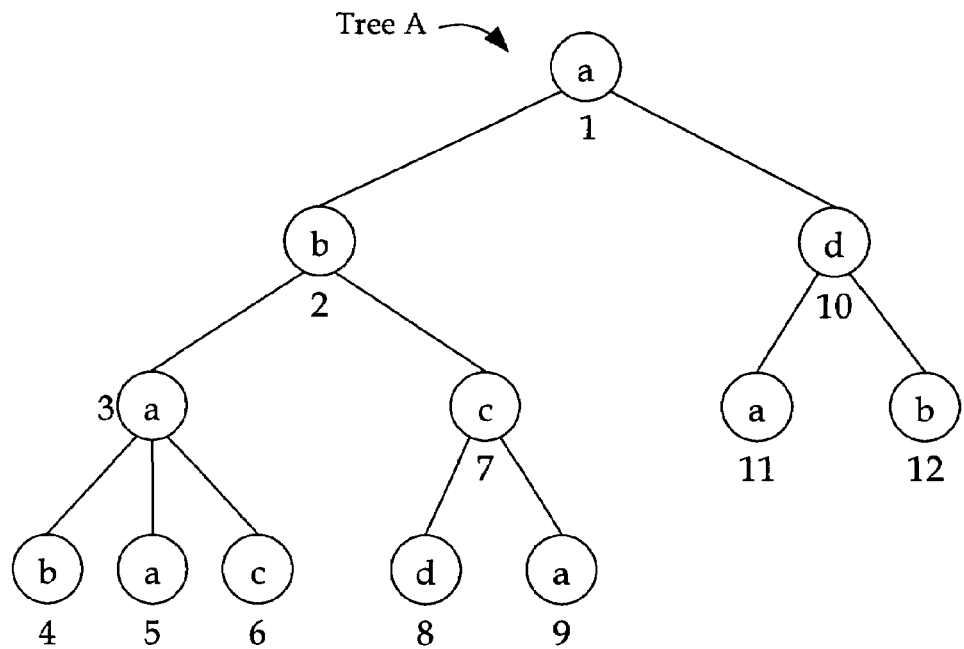
FIG. 1 is a diagram that illustrates two trees that represent the hierarchical relationships among nodes in their respective documents, according to an embodiment of the invention.
Figure 1:
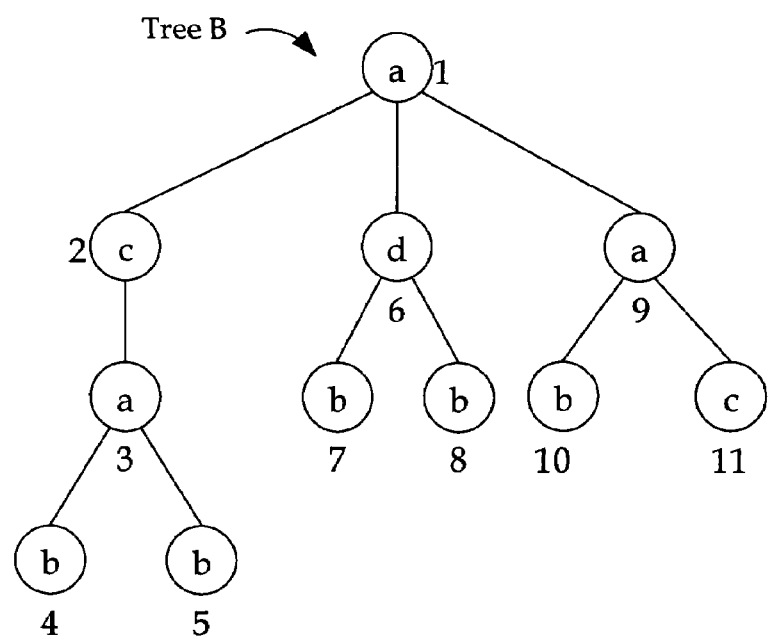

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are disclosed herein for differencing a first and a second document to produce an edit script, that, when applied to the first document (referred to herein as "patching"), will produce the second document.

Additional techniques are disclosed herein for patching a first document by applying an edit script to the first document to modify the first document or to generate a new document that is based on the first document and the modifications specified in the edit script.

A user may choose one of two ways to produce the edit script, referred to as global diff and local diff. In generating an edit script using global diff, the entire trees of each input document are compared at once. In generating an edit script using local diff, corresponding subtrees from each input document are compared one at a time.

To produce an edit script using global diff, an edit graph is created that comprises of at least two axes. One axis includes an ordered set of all the nodes in the first document and the other axis includes an ordered set of all the nodes in the second document. All possible paths through the edit graph are generated where a diagonal line indicates that the nodes identified by the point in the edit graph are the same. A horizontal and vertical line either indicates a deletion or an insertion of a corresponding node.

To produce an edit script using local diff, according to an embodiment of the invention, an edit graph is created that comprises of at least two axes. One axis includes an ordered set of all child nodes of a first subtree in the first document and the other axis includes an ordered set of all child nodes of a subtree in the second document that corresponds to the first subtree. A separate edit graph is generated for each subtree in the first document. All paths through each edit graph which may produce a minimal (i.e. minimal for current subtree) edit script are generated. However, for local diff, all possible paths are not necessarily examined because extra knowledge may be used to discard possible paths. However, the purpose of both global and local diff is the same—to find the least cost path through the edit graph(s).

Once an edit script is generated (whether through global diff or local diff, or manually) an input document may be "patched" by the edit script. In other words, the edit script is applied to the first document or any other input document to produce a new document that is based on the input document and the modifications specified by the edit script.

According to an embodiment of the invention, a pull parser is used to generate events representing the input document and the edit script. Each event (i.e. node event) generated from the input document corresponds to a node in the input document. Each event (i.e. operation event) generated from the edit script corresponds to an operation specified in the edit script.

The examples set forth below refer to XML documents. However, the techniques disclosed herein are not limited to XML and may be implemented on other forms of structured data, such as HTML.

Global Diff

As mentioned above, there are at least two ways to produce an edit script based on two XML documents—global diff and local diff. Implementations of global diff compare the entire tree structure of a first XML document with the entire tree structure of a second XML document. Implementations of local diff, on the other hand, compare only the immediate children of a node of a first XML document with the immediate children of the corresponding node of the second XML document, at a time.

Performing a global diff on two documents generates an edit script that is at least as efficient as an edit script generated using local diff, and in many cases, global diff generates a more efficient edit script (i.e. less operations are required to transform the first document into the second document). In order to generate an edit script, a distance matrix is created. But first, in order to understand an implementation of a distance matrix, an edit graph will be described, which is a conceptual view of a distance matrix.

Edit Graph

According to an embodiment of the invention, an edit graph is discussed to describe how the tree structures of two input documents are compared. Each tree may be represented as an ld-pair. The ld-pair of a tree node may be defined to be the pair (l, d), where l is the node's label (i.e. name) and d is the node's depth in the tree. References to p.l and p.d are used to refer to, respectively, the label and depth of an ld-pair. The ld-pair representation of a tree is the list, in preorder, of the ld-pairs of its nodes. A tree can be converted to this representation using a single preorder traversal.

Consider trees A and B depicted in FIG. 1. FIG. 1 is a diagram that illustrates trees A and B and which represent the hierarchical relationships among nodes in their respective documents, according to an embodiment of the invention. The letter inside each node represents its label and the number next to each node is the node's preorder rank, which may also serve as the node's identifier. The ld-pair representations of A and B are as follows.

Given a tree (in ld-pair representation) $A=(a_1\ a_2\ \ldots\ a_m)$, the notation A[i] refers to the $i^{th}$ node $a_i$ of tree A. Thus, A[i].l and A[i].d denote, respectively, the label and the depth of $a_i$. There may also be other attributes of a particular node that may be referenced when comparing nodes. For example, the nodes of an input document may have an attribute node associated with each element node. The attribute node may be a unique identifier, such as ID. Therefore, the ID of a node $a_i$ may be referenced by A[i].ID.

Figure 2:
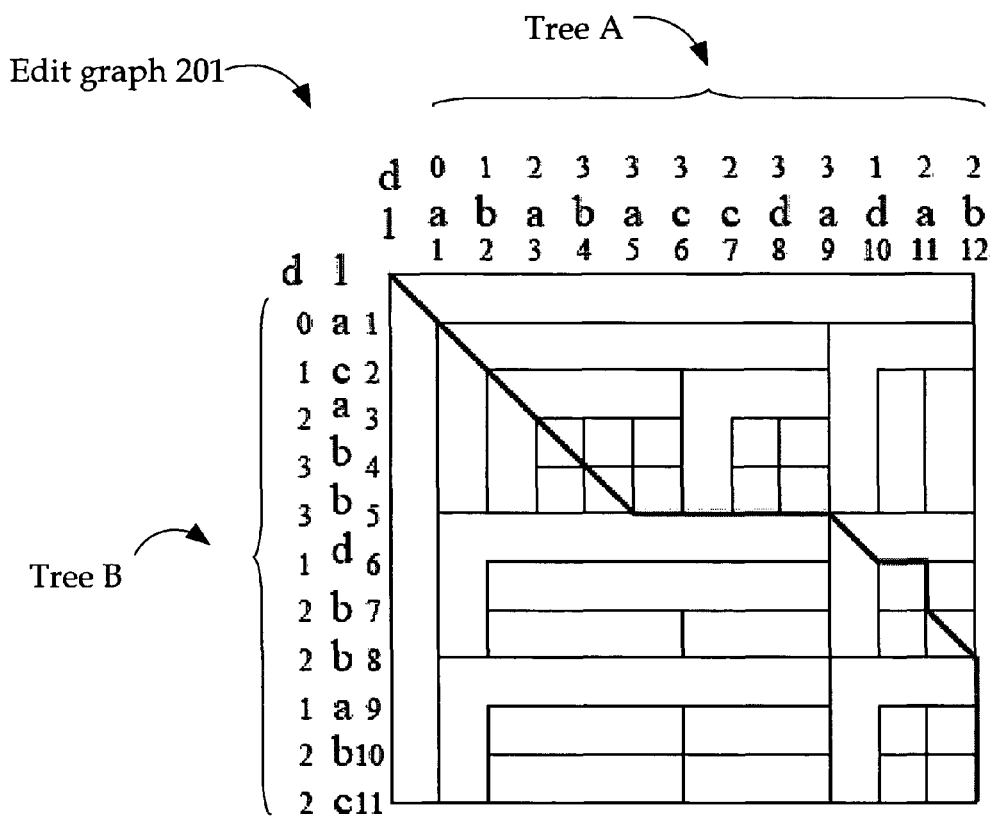
FIG. 2 is a diagram that illustrates an edit graph that is generated using global diff and that is based on the trees of FIG. 1, according to an embodiment of the invention.

FIG. 2 is a diagram that illustrates an edit graph 201 that may be generated using global diff and is based on the trees of FIG. 1, according to an embodiment of the invention. Edit graph 201 consists of a (M+1)×(N+1) grid of nodes as suggested by FIG. 2, where M is the number of nodes in tree A and N is the number of nodes in tree B. There is a point at each (x, y) location for $x \in [0\ldots(M+1)]$ and $y \in [0\ldots(N+1)]$. These points may be connected by various directed edges. According to FIG. 2, horizontal edges represent deletions, vertical edges represent insertions, and diagonal edges represent matching nodes (and also may represent an update operation if the labels of the matched nodes differ). If tree A was positioned on the vertical axis and tree B positioned on the horizontal axis, then horizontal edges would represent insertions and vertical edges would represent deletions. The directed edges are as follows.

There is a diagonal edge from point (x, y) to point (x+1, y+1) if the depth of the respective nodes are the same (i.e. A[x+1].d=B[y+1].d). (For clarity, many of these edges are omitted in FIG. 2.) An extra limitation for a diagonal edge may be that the names of the respective nodes must also be the same (i.e. A[x+1].l=B[x+1].l). Another limitation for a diagonal edge may be that the attributes of the respective nodes must also be the same. Therefore, according to one embodiment, the label of a node (e.g. A[i].l) may also include the attributes and attribute values of the node. According to another embodiment, the array of nodes (i.e. A[ ]) for tree A may be defined as having an attribute array (e.g. att[ ]) and a corresponding attribute value array (e.g. attv[ ]) for each node in tree A. Here, for example, the $k^{th}$ attribute and the corresponding attribute value of a node $a_i$ may be referenced, respectively, by A[i].att[k] and A[i].attv[k].

To indicate a deletion, a horizontal edge in an edit graph is generated from point (x, y) to point (x+1, y) unless there are more nodes to traverse in tree B (i.e. y<N) and the depth of the node in tree B is greater than the depth of the corresponding node in tree A (i.e. B[y+1].d>A[x+1].d).

To indicate an insertion, a vertical edge in an edit graph is generated from point (x, y) to point (x, y+1)) unless there are more nodes to traverse in tree A (i.e. x<M) and the depth of the node in tree A is greater than the depth of the corresponding node in tree B (i.e. A[x+1].d>B[y+1].d).

Any type of extra limitation on when a diagonal, horizontal, or vertical line is drawn may be used, similar to the limitation given above regarding the comparison between the labels of nodes in the two trees.

Each edge has an edge weight equal to the cost of the corresponding edit operation. Several horizontal and vertical edges may be missing from an edit graph. Intuitively, the missing vertical edges ensure that once a path in the edit graph traverses an edge signifying the deletion of a particular node, that path can only continue by traversing edges that signify the deletion of all the nodes in the particular node's subtree. Similarly, the missing horizontal edges ensure that any path that traverses an edge signifying the insertion of a particular node can only continue by traversing the edges signifying insertion of all nodes in the particular node's subtree.

Any minimum-cost edit script that transforms A to B can be mapped to a path from (0, 0) to (M, N) in the edit graph; conversely, every path from (0, 0) to (M, N) corresponds to an edit script that transforms A to B.

For example, the path indicated using bold lines in FIG. 2 corresponds to the following example edit script, where 1) $n_1, \ldots n_4$ are arbitrary identifiers for the newly inserted nodes, 2) the second element in an insert operation identifies the inserted node as the nth child of the inserted node's parent node in the first document, 3) the third element of the insert operation identifies the preorder rank of parent of the inserted node in the first document, and 4) the fourth element of the insert operation is the label of the inserted node:

upd(2, c),
upd(5, b),
del(6),
del(7),
del(8),
del(9),
del(11),
ins($n_1$, 1, 10, b),
ins($n_2$, 3, 1, a),
ins($n_3$, 1, $n_2$, b),
ins($n_4$, 2, $n_2$, c).

Given a (M+1)×(N+1) edit graph, such as edit graph 201 of FIG. 2, a matrix D is defined such that (M+1)×(N+1) is the size of D and D[x, y] is the length of a shortest (i.e. least cost) path from (0, 0) to (x, y) in edit graph 201. D is called the "distance matrix" for edit graph 201.

For notational convenience, the weight of an edge that is missing from an edit graph may be defined as infinity. Any path that connects the origin (0, 0) to point n=(x, y) in an edit graph G may be considered. Given G's structure, the previous point on this path is either the point to the left of n, the point above n, or the point diagonally to the left and above n. Therefore, the distance of point n from the origin cannot be greater than that distance for the point to its left plus the weight of the edge connecting the left neighbor to point n. Similar relations hold for the top and diagonal neighbors of point n, yielding the following recurrence for D[x, y], where 0<x<=M, 0<y<=N, $c_u$ is the cost of an update, $c_d$ is the cost of a deletion, and $c_i$ is the cost of an insertion:

D[x, y] = min{m1, m2, m3, m4}, where
 $m_1$ = D[x−1, y−1], if(((x−1, y−1), (x, y)) ∈ G & A[x].1 = B[y].1)
  ∞otherwise;
 $m_2$ = D[x−1, y−1] + $c_u$(A[x], B[y]), if((x−1, y−1), (x, y)) ∈ G
  ∞otherwise;
 $m_3$ = D[x−1, y] + $c_d$(A[x]), if((x−1, y), (x, y)) ∈ G
  ∞otherwise;
 $m_4$ = D[x, y−1] + $c_i$(B[y]), if((x, y−1), (x, y)) ∈ G
  ∞otherwise.

This recurrence leads to the following dynamic-programming algorithm for computing the distance matrix D.

The input to the algorithm for computing the shortest cost path through edit graph G are arrays A and B, which represent trees in ld-pair representation. As describe above, A[i].l and A[i].d denote, respectively, the label and depth of node $a_i$ (and analogously for B). The number of nodes in A and B is M and N, respectively.

The distance matrix D is such that, as described above, D[i, j] equals the length of the shortest path from (0, 0) to (i, j) in the edit graph of A and B. One or more other criteria may be used to select a path through matrix D other than cost. For example, the path that is selected may be the path with the least number of operations to perform, irrespective of whether the operation is an update, insertion, or deletion. The following illustrates pseudo code for an algorithm for generating distance matrix D, according to an embodiment of the invention.

First, D is initialized at the origin (0, 0), followed by computing the costs along the top and left edge of the matrix. The nested for-loop is a direct implementation of the recurrence for D[i, j].

```
D[0, 0] = 0;
for (i=1; i <= M; i++) {
    D[i, 0] = D[i−1, 0] + c_d(A[i]);
}
for (j=1; j <= N; j++) {
    D[0, j] = D[0, j−1] + c_i(B[j]);
}
for (i=1; i <= M; i++) {
    for (j=1; j <= N; j++) {
        m_1 = ∞, m_2 = ∞, m_3 = ∞, m_4 = ∞,
        if(A[i].d = B[j].d & A[i].1 = B[j].1)
            m_1 = D[i−1, j−1];
        if(A[i].d = B[j].d)
            m_2 = D[i−1, j−1] + c_u(A[i], B[j]);
        if(j = N or B[j+1].d <= A[i].d)
            m_3 = D[i−1, j] + c_d(A[i]);
        if(i = M or A[i+1].d <= B[j].d)
            m_4 = D[i, j−1] + c_i(B[j]);
        D[i, j] = min{m_1, m_2, m_3, m_4};
    }
}
```

Once distance matrix D is computed, the shortest (i.e. least cost) path from (0, 0) to (M, N) may be recovered. According to an embodiment, starting at (M, N) and tracing the recurrence relation for D backwards, the horizontal, vertical, and diagonal edges are traversed while emitting the appropriate deletion, insertion, and update operation. Thus, the following algorithm may be used for recovering an edit script from the distance matrix D.

The input to the following algorithm are arrays A and B representing input trees A and B (as in FIG. 1) and the distance matrix D computed above. The output of the algorithm is a minimum-cost edit script that transforms A to B. For simplicity of presentation, the insertion and deletion operations only identify the nodes being inserted and deleted. Also, insertions of interior nodes are printed after the insertions of their descendants; this ordering is easily fixed. According to an embodiment, a state machine is used to help group operations of nodes in a sub tree into one operation. For example, all delete operations for nodes which are descendents of the root of the sub tree are grouped into one delete operation of the root of the sub tree. Similarly, all insert operations for nodes which are descendents of the root of the sub tree are grouped into one insert operation of the root of the sub tree.

The following is pseudo code for one embodiment of generating an edit script. At each iteration of the while loops, i and/or j is decremented by one.

```
i = M; j = N;
while(i > 0 and j > 0) {
    if(D[i, j] = D[i−1, j] + c_d(A[i]) and (j = N or B[j+1].d <= A[i].d)) {
        print("del " i);
        i−−;
    }
    else if(D[i, j] = D[i, j−1] + c_i(B[j]) and
    (i = M or A[i+1].d <= B[j].d)) {
        print("ins " j);
        j−−;
    }
    else {
        if(A[i].1 != B[j].1)
            print("upd " i ", " B[j].1);
        i−−; j−−;
    }
}
while(i > 0) {       // If i > 0, then j = 0 meaning there are only deletions
                     // left to
                     // perform.
    print("del " i);
    i−−;
}
while(j > 0) {       // If j > 0, then i = 0 meaning there are only insertions
                     // left to
                     // perform.
    print("ins " j);
    j−−;
}
```

In other embodiments, the edit script produced by the above algorithm is in XML. For example, assume an input document is an XML document with the following nodes:

```
<simpleType name="USState">
    <restriction base="string">
        <enumeration value="NY"/>
        <enumeration value="TX"/>
        <enumeration value="CA"/>
    </restriction>
</simpleType>
```

Then, assume another "enumeration" node is added (e.g., <enumeration value="FL"/>) to the input document to produce a second document, with the following elements:

```
<simpleType name="USState">
    <restriction base="string">
        <enumeration value="NY"/>
        <enumeration value="TX"/>
        <enumeration value="CA"/>
        <enumeration value="FL"/>
    </restriction>
</simpleType>
```

The XML generated for appending such an element node to the input document may be the following:

```
<xd:append-node xd:parent-xpath="/simpleType[1]/restriction[1]"
    xd:node-type="element">
    <xd:content>
        <enumeration value="FL"/>
    </xd:content>
</xd:append-node>
```

This edit script operation identifies not only the content of the node to add (<enumeration value="FL"/>), but also what type of node (node-type="element") and where the node is added (parent-xpath="/simpleType[1]/restriction[1]").

Local Diff

Local diff is faster than global diff because, for local diff, differences between corresponding subtrees are examined one subtree at a time, and not the entire tree at once. This means that instead of generating one large edit graph for the entire tree, local diff will cause the generation of multiple edit graphs (e.g. five edit graphs in the case of input tree A of FIG. 1). Specifically, at most one edit graph for each subtree in the first input document may be generated because there might not be a corresponding subtree in the second input document.

The number of immediate children of a root of a particular subtree is typically much less than the number of nodes of an entire tree. Therefore, local diff also consumes less memory resources, because the typical size of an edit graph (or a distance matrix) is small. However, local diff does not ensure that the edit script generated thereby is minimal (i.e. there may be other edit scripts that produce the same second document with less operations on the first document).

Figure 3:
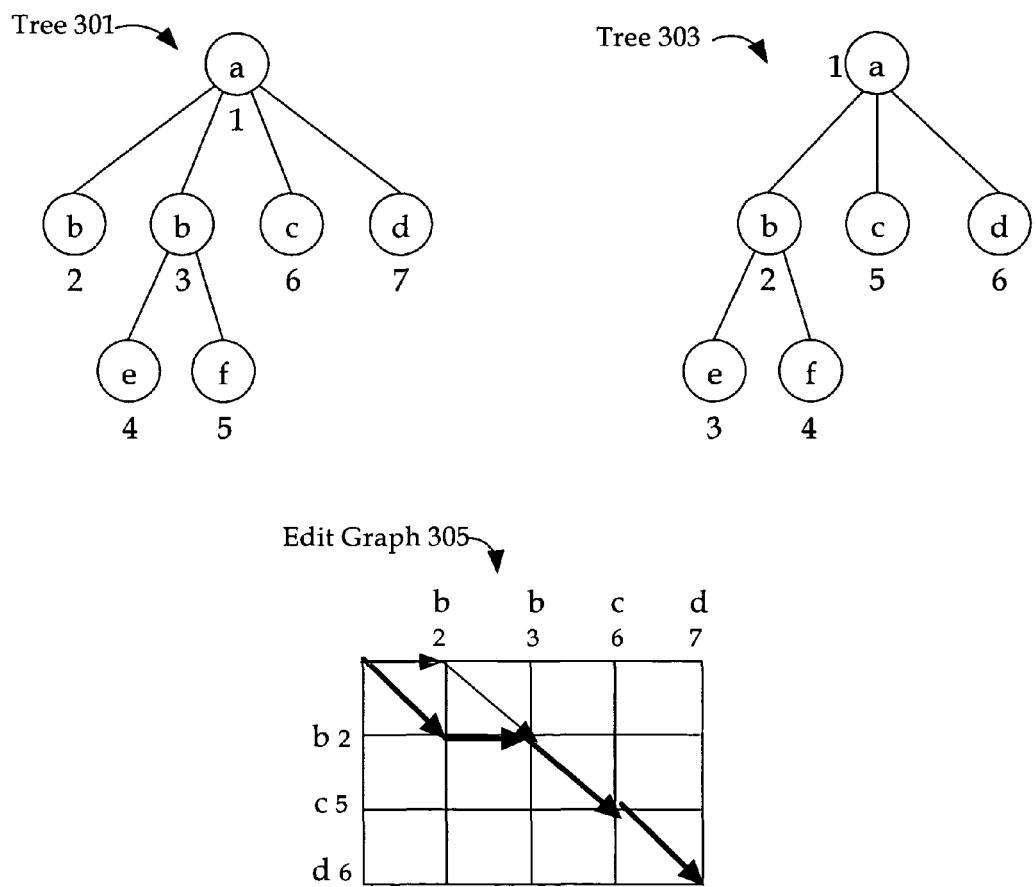
FIG. 3 illustrates two input trees and the edit graph generated based thereon using local diff, according to an embodiment of the invention.

For an example of the possibility of such a non-minimal edit graph, refer to FIG. 3. FIG. 3 illustrates a tree 301 that represents a first input document, a tree 303 that represents a second input document, and an edit graph 305 that is generated based thereon using local diff, according to an embodiment of the invention.

The horizontal axis of edit graph 305 includes the subtree of tree 301 where 'a' is the root and 'b', 'b', 'c', and 'd' are the children. The vertical axis of edit graph 305 includes the corresponding subtree of tree 303 where 'a' is the root of the subtree and 'b', 'c', and 'd' are the children.

For purposes of readability, only two paths are shown in edit graph 305. Other paths may include three down arrows (indicating three insertions) followed by four right arrows (indicating four deletions). Also, the depths of the respective nodes are not shown in edit graph 305 since, by definition, all nodes identified in an edit graph using local diff will be at the same depth.

The edit script for edit graph 305, according to the bolded path, may be the following:
    del(3)
which indicates that the second 'b' is deleted. Deleting the second 'b' in tree 301 means that all the children of the second 'b' will be deleted. In that case, the edit script for the entire tree will be the following:
    ins(n1, 1, 2, e),
    ins(n2, 2, 2, f),
    del(3),
    del(4),
    del(5).

Generating an edit script based on tree 301 and tree 303 using global diff would result in a minimal edit script, which is the following:

del(2)

Thus, although edit graph 305 generated by local diff is smaller than an edit graph generated by global diff and therefore faster, global diff produces a smaller (and, in this case, minimal) edit graph.

Domhashing

In order to speed up the process for global and local diff and also produce more accurate edit scripts for local diff, DOMHASHING is introduced. DOMHASHING is a way to produce a digest (hash) value for each node in a tree such that, to a high degree of probability, if two hash values are the same, then the corresponding nodes are the same.

If the hash values are different, then the corresponding nodes must be different. In other words, a particular input to a DOMHASH algorithm will always generate the same hash value, no matter how often the particular input is processed by the execution of the DOMHASH algorithm. Algorithms to generate a hash value for a particular node include, but are not limited to, MD5 and SHA-1.

Instead of comparing the labels and/or depths of two nodes, the hash value for the respective nodes are compared. The hash value for a particular node may be generated based on any combination of the following: the label (i.e. name) of the particular node, the attributes (if any) of the particular node, the names of the immediate children of the particular node, the hash value of first child of the particular node, etc. The resulting hash value may be any length but it is typically a fixed length value of 128 or 160 bits.

According to one embodiment, the hash value for a particular node is generated based on the concatenation of the name or content of the node, the attributes, if any, of the node, and the hash values of any immediate children of the node. Therefore, a hash value may first be generated for the "leaf" nodes and then for the parents of the leaf nodes, and so forth until the root node is reached. Generating hash values in this bottom-up manner ensures that the hash values of the root and interior nodes take into account all of their respective descendents, not just their respective immediate children.

Hash Level

According to one embodiment, a user is provided the option to specify a hash level in an input document below which the nodes of the respective input documents are not compared. Hash values are generated for each node at or below the hash level. For example, if a user wants to use the global diff algorithm on two input documents and specifies three as the hash level, then a distance matrix is generated with axes that correspond to nodes from both input documents from the respective root nodes to nodes at the depth of three. The distance matrix does not have any columns or rows that correspond to nodes at depth four and below in either input documents.

The ability to specify a hash level in combination with DOMHASH is even more effective in terms of improving the speed while maintaining the quality of the edit script, when the user knows the basic structure of an input document and the structure of the input document lends itself to being compared at a particular level in the node hierarchy. It is easy for the user to come up with a good hash level for most structured data. For example, suppose an input document specifies a series of purchase orders (<PO>) such as the following:

```
<POs>
    <PO order num="101">
    ...
    </PO>
    <PO order num="102">
    ...
    </PO>
    ...
</POs>
```

Here, the root node is <POs>, which is at hash level one, and the child nodes of <POs> are multiple <PO>'s, which are at hash level two. Nodes below the <PO> nodes may include shipping and billing information, such as name, address, phone number, email address, etc. Suppose further that an input document identified all the purchase orders that have yet to be delivered. By diffing two purchase order input documents, the user will see all the purchase orders that have been delivered.

If global diff is implemented without specifying a diff level, an edit graph would be generated that identified all nodes in the respective input documents, including the nodes pertaining to shipping and billing information. However because the user knows the structure of the document, the user may specify two as the hash level and an edit graph will be generated that includes all the purchase order nodes and zero nodes below <PO> in the respective input documents. The distance matrix is thus greatly reduced in size and, consequently, the edit script is generated much more quickly.

In the above example, if the user specified any hash level greater than two, the same edit script would be generated, but the time to generate the edit script would be longer. If the user specified a hash level less than two, a correct edit script would be generated, but the edit script may not be minimal. In summary, if a user specifies a hash level greater than the "optimal" hash level (if one exists), then the resulting edit script is the same but it will take longer to generated. And if the user specifies a hash level less than the "optimal" hash level, then the resulting edit script may not be minimal.

If a user specifies a hash level equal to the maximum depth of the input document, then an edit script is generated that is the same as an edit script generated by global diff. However, the time to compute the edit script with DOMHASH may still be faster than global diff without DOMHASHING for input documents with long strings. The difference in speed is because comparing hash values is much faster than comparing long strings.

Example Using Hash Values

Figure 4:
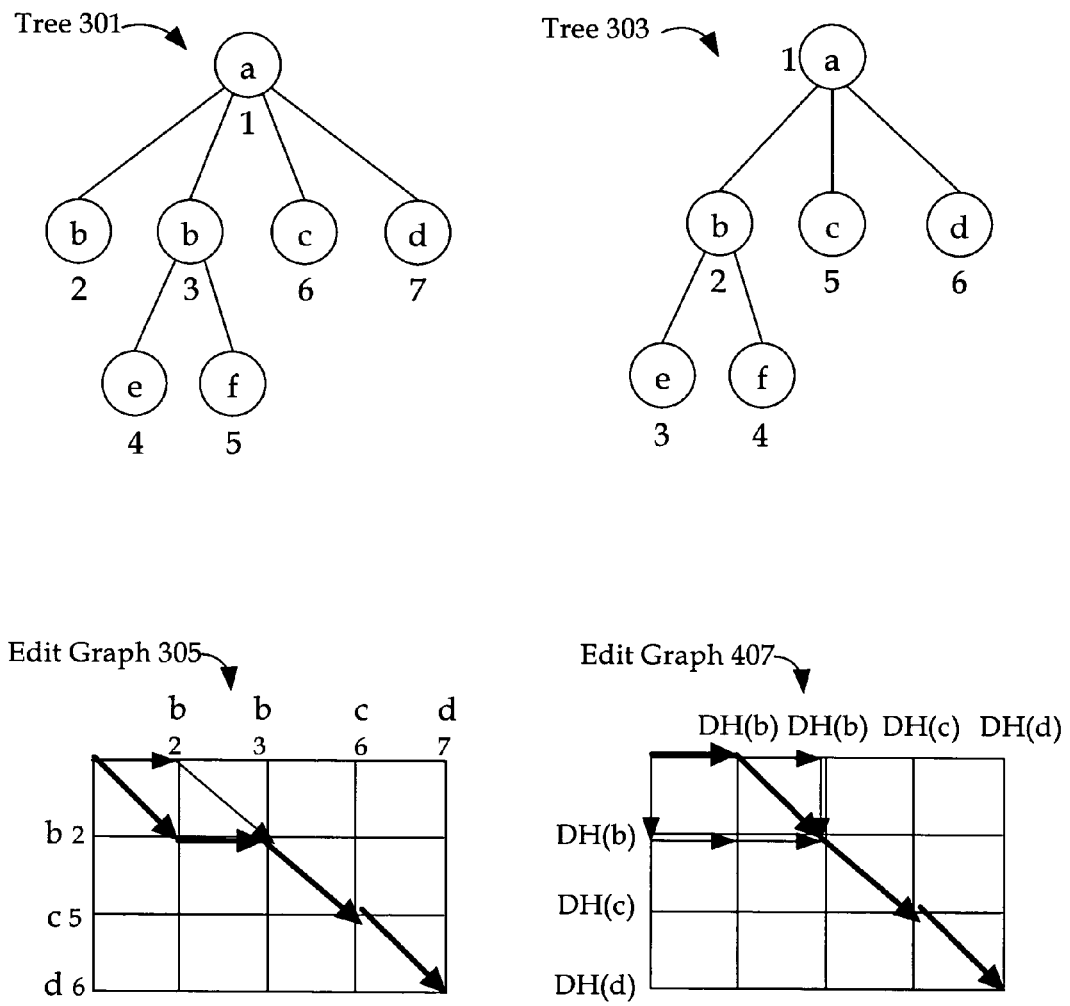
FIG. 4 illustrates the difference between using local diff to generate an edit graph and using local diff with DOMHASH to generate an edit graph, according to an embodiment of the invention.

An example is provided for using DOMHASHING with distance matrices to produce edit scripts faster (in the case of both global diff and local diff) and to improve the quality of edit graphs. FIG. 4 illustrates an edit graph 407 generated according to local diff. Edit graph 407 identifies the hash values for each node in trees 301 and 303, instead of just the name of the node and/or the depth of the node. Therefore, input arrays (e.g. A[i]) may indicate, in addition to the label (i.e. A[i].l) and depth (i.e. A[i].d) of a node $a_i$, the hash value (e.g. A[i].hv) of node $a_i$.

Because it is highly unlikely that two different inputs to the DOMHASHING algorithm will generate the same hash value, it is very unlikely that, according to FIG. 4, the hash value of the first 'b' in tree 301 will be the same as the hash value of the first 'b' in tree 303. The three lowest-cost paths through edit graph 407 are indicated by the bolded path and the two non-bolded paths. The least-cost path through edit graph 407 is the bolded path because the bolded path indicates only one operation (a deletion), whereas the non-bolded paths indicate three operations (an insertion and two deletions and two insertions and a deletion).

Streaming Patch

Once an edit script is generated, the edit script may be applied to a document. This is referred to as "patching" a document. If an edit script is correctly generated from a diff of a first XML document and a second XML document, then patching the first XML document with the edit script will result in the second document.

As mentioned above, patching the DOM representation of an input document using the DOM representation of an edit script requires a significant amount of resources. The DOM representation of an input document will typically require five to ten times more memory than the original input document. Therefore, to conserve system resources, each node from the input document and edit script is read into memory one node at a time. One way to perform this is through Streaming XML, which is specified in Java Specification Request (JSR) 173, available at http://jcp.org. The following embodiments are not limited to any particular implementation. Other implementations may be used to stream nodes from an input document and edit script one node or operation at a time, such as Simple API for XML (SAX).

A pull parser, such as the pull parser specified in JSR 173, generates an "event" for each element tag and node content read from the input document and the edit script. A pull parser may be any set of instructions that, when executed, generates "events" for each element tag and node content read from an input document. Thus, if an operation from an edit script is the following:

```
<xd:append-node xd:parent-xpath="/simpleType[1]/restriction[1]"
    xd:node-type="element">
    <xd:content>
        <enumeration value="FL"/>
    </xd:content>
</xd:append-node>
``` then five events may be generated—one for the beginning "append-node" tag, one for the beginning "content" tag, one for the content of the "content" node, one for the ending "content" tag, and one for the ending "append-node" tag.

According to an embodiment, the operations in an edit script may refer to nodes in the input document using XPath notation, as illustrated above. Also, the operations may be in XML, as illustrated above, and defined according to a particular XML schema.

Figure 5:
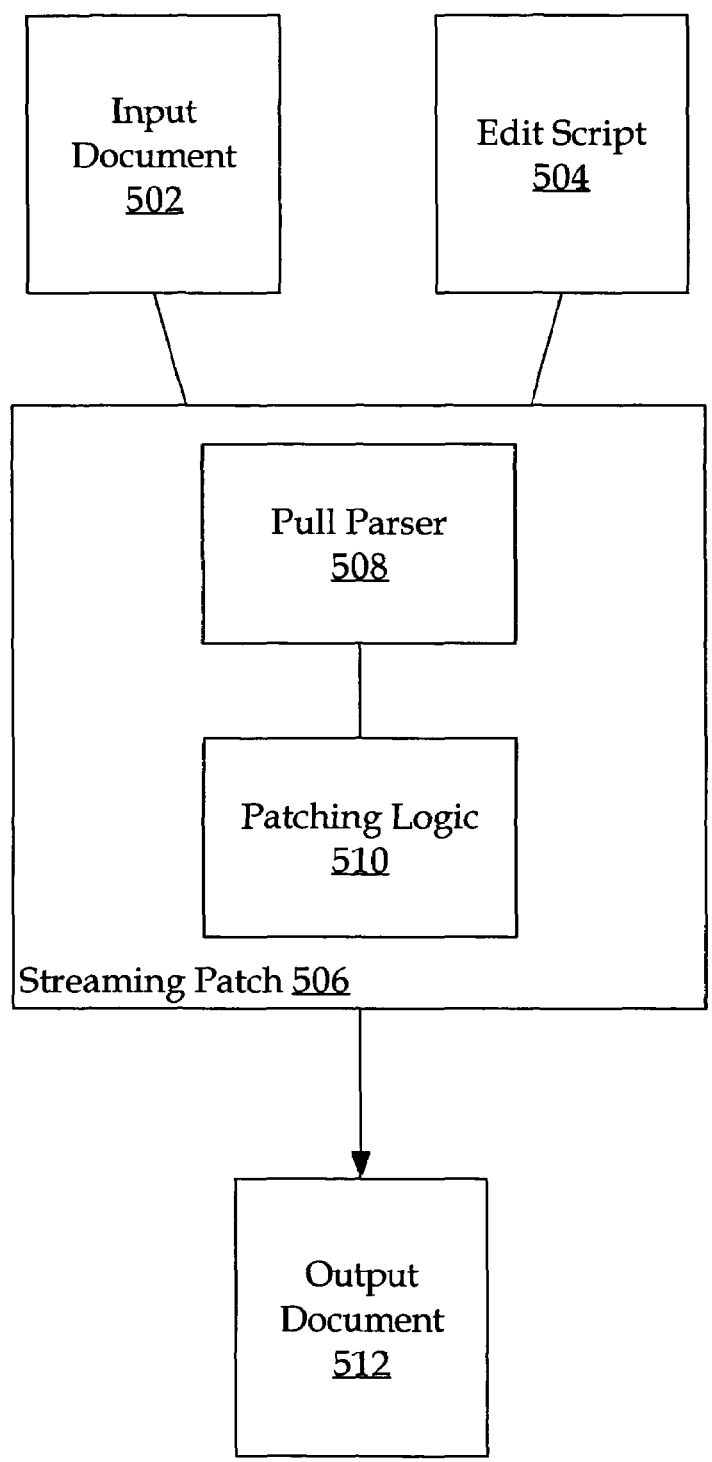
FIG. 5 is a block diagram that illustrates various modules for patching an input document, according to an embodiment of the invention.

Events from the input document and edit script may be generated in a streaming fashion and processed one at a time to "patch" the input document. FIG. 5 is a block diagram that illustrates modules 506-510 for patching an input document 502, according to an embodiment of the invention. A streaming patch 506 comprises a pull parser 508 and a patching logic 510. Input document 502 and an edit script 504 are read into memory one event at a time. Pull parser 508 generates node events for nodes in input document 502 and operation events for operations in edit script 504. Generated events are passed to patching logic module 510 where input document 502 is patched by edit script 504. An output document 512 is created based on modifications, if any, that were made to input document 502. Output document 512 may be a document in an Event representation, a DOM representation, in a regular XML representation. The operations specified by edit script 504 may be performed directly on input document 502 or reflected in a new document.

From a user's perspective, streaming patch 506 is a producer of events, such as a pull parser. Patch logic 510 acts as a filter between pull parser 508 and the user. Thus, patch logic 510 acts as both a consumer and producer of events.

Streaming patch 506 may be an application executing on a machine in the role of a server in a client/server communication architecture or an application executing on a stand-alone machine. Also, the components of streaming patch 506 are not limited to running on a single machine, but may reside on separate, communicatively-coupled machines, connected either directly or via one or more networks.

Figure 6:
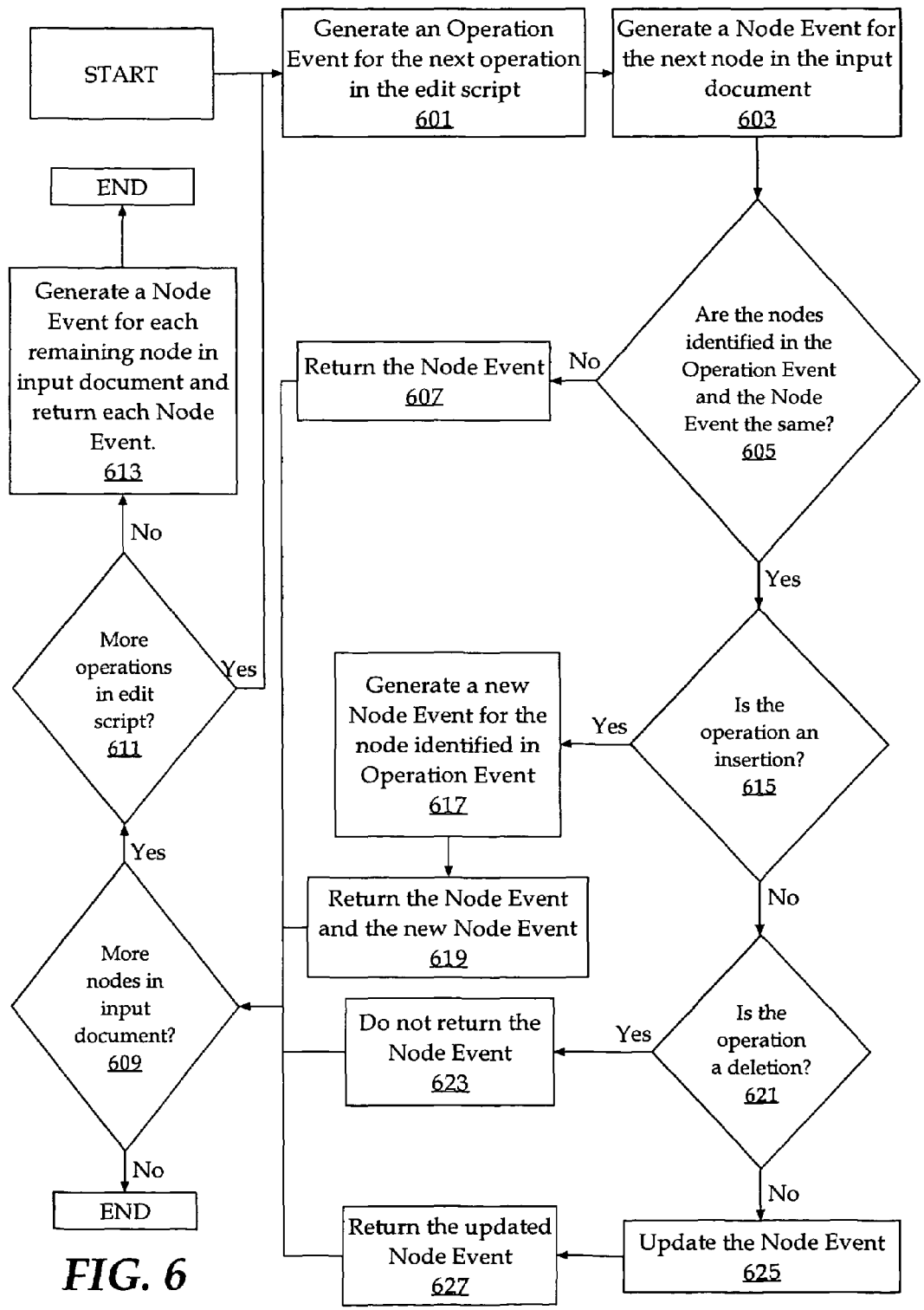
FIG. 6 is a flow chart that illustrates the steps to perform for patching a document using an Event-based method, according to an embodiment of the invention.

FIG. 6 is a flow chart that illustrates the steps performed by streaming patch 506 for patching input document 502, according to an embodiment of the invention.

First, at step 601, an operation event is generated for the first operation in the edit script. At step 603, a node event is generated for the first node in the input document. At step 605, it is determined whether the node identified by the operation event (generated at step 601) is the same as the node identified by the node event (generated at step 603). For example, for the purposes of steps 601-605, the operation event corresponding to the "append-node" operation above may simply be the event for the beginning "append-node" tag, because the "append-node" tag identifies the node in the input document that is to be modified. Likewise, the node event may simply be the event for the beginning tag of the node, because that information is enough to determine whether the node associated with that beginning tag is modified by the operation event.

Referring to step 605, step 605 may also include logic for determining whether the node identified in the operation event is logically before or after the node identified in the node event. If the node identified in the operation event is logically before the node identified in the node event, then another operation event is generated for the next operation in the edit script (i.e. steps 611 and 601). If there are no more operations in the edit script, then the logic proceeds to step 613.

If the node identified in the operation event is logically after the node identified in the node event, then the node event is returned and another node event is generated for the next node in the input document.

In order to determine whether the node identified in the operation event is logically before or after the node identified in the node event, then the current state (e.g. XPath notation of the node identified by the current node event) has to be maintained.

Maintaining State

According to an embodiment, in order to determine whether the nodes identified by the operation event and the node event are the same, the state of the input document examined is maintained. The state is used for correlating the XPath locations referenced in the operation event to the node identified by the node event. A stack may be used to determine state by storing the XPath indices of the nodes already read from the input document. Depending on whether operations refer to the input document or the output document, a delta table may be used to reflect the changes (e.g. insertions and deletions) which have occurred thus far. The stack is used to determine whether the node identified by the operation event is the same as the node identified by the node event. The stack refers to the node identified by the current node event.

A delta table associated with the stack may also be maintained depending on whether the nodes identified by the operations in the edit script reference the input document ("snapshot model") or the output document (i.e. "current model").

For example, suppose node events from an input document have been generated for seven purchase orders and the shipping address of the seventh purchase order. The stack may then indicate the following XPath notation:

/purchaseOrders/purchaseOrder[7]/shippingAddress.

Further suppose that the sixth purchase order in the input document was deleted by a previous operation and that the operation identified by the current operation event is an update operation that modifies the shipping address of the seventh purchase order in the input document. If the snapshot model is used, then the update operation would refer to the node being updated using the following XPath notation:

/purchaseOrders/purchaseOrder[7]/shippingAddress.

Because the XPath identified to by the operation is the same as the XPath indicated by the stack, then the operation is performed.

If the current model is used and the deletion was performed, then the update operation would refer to the node being updated using the following XPath notation:

"/purchaseOrders/purchaseOrder[6]/shippingAddress"

If a delta table was not employed, then the node identified by the update operation would not be the same as the node identified by the stack and the update operation would not be performed. Thus, additional state is maintained using a delta table. According to an embodiment, the delta table is implemented in memory. The delta table may also be implemented as a relational table in an RDBMS database. However, embodiments of the invention are not limited to any particular implementation of the delta table.

In order to visualize how a delta table may be implemented, references to rows and columns will be used. Each row in the delta table refers to a particular path where a node was inserted or deleted. The corresponding column indicates changes that have occurred to nodes under a certain path.

Returning to the example, when the sixth purchase order was deleted, an entry in the delta table is inserted (or updated if the path was changed previously) and the delta value corresponding to the entry may indicate "+1." This delta value is added to the XPath identified by the operation event and compared with the XPath indicated by the stack. The result of adding the delta value to the XPath identified by the operation event is /purchaseOrders/purchaseOrder[7]/shippingAddress.

Because the above XPath is the same as the XPath currently indicated by the stack, the update operation is performed.

Thus, step 605 may include comparing the XPath location specified in the operation event with the XPath location as specified by the stack.

In summary, the operations in the edit script under the current model approach reference nodes in the output document as the output document is being generated. Under the snapshot model approach, operations reference nodes in the input document. The stack may be maintained to support both models and a delta table may be maintained to support the current model.

Streaming Patch (Cont.)

Returning to step 605, if the nodes are not the same, then the node event is returned (step 607). To "return" a node event refers to the fact that the node event is ultimately processed, whether the node events are saved directly into the output document, whether each node event is translated back into a regular node and saved into the output document, or whether a DOM representation of the output document is generated as each node event is returned.

The logic proceeds to step 609 where it is determined whether there are any nodes remaining in the input document. If there are no more nodes, then the process ends despite the fact that there might be operations that have not been examined in the edit script.

If there are more nodes in the input document, then it is determined whether there are more operations in the edit script (step 611). If there are no more operations in the edit script, then a node event is generated and returned for each remaining node in the input document (step 613).

If, at step 605, it is determined that the nodes identified by the operation event and the current node event are the same, then it is determined which type of operation (i.e. insert, delete, or update) is specified by the operation event. The order of checks to determine which operation to perform is not important. Any other order to determine the type of operation may be used. Here, at step 615, if it is determined that the operation specified by the operation event is an insertion, then the logic proceeds to step 617 where a new node event is generated for the node specified by the operation event. At step 619, the current node event and the new node event are returned.

The insert operation may specify which node event (i.e. the current node event or the new node event) is returned first. The operation may specify whether the new node is to be inserted before the current node or as the last child of the current node. Therefore, step 619 may also include a step of determining an order to return the new node event and the current node event relative to each other based on the ordering indicated in the operation. After the new node event and the current node event are returned, logic proceeds to step 609, described above.

If the operation specified in the operation event is not an insertion (step 615), then it is determined whether the operation is a deletion (step 621). If so, then the node event is not returned and the logic proceeds to step 609, described above.

If, at step 621, the operation is not a deletion, then the operation must be an update (e.g. rename). The node event is updated to reflect the operation specified by the operation event and the updated node event is returned. Logic then proceeds to step 609.

According to an embodiment, the input document and edit script are in document order. Document order is the order in which nodes appear in the XML serialization of a document. Document order satisfies the following constraints: 1) the root node is the first node, 2) every node occurs before any of its children and descendants, 3) attribute nodes immediately follow the element node with which they are associated, and 4) for every set of sibling nodes, if a particular sibling node occurs before another sibling node, then any children and descendents of that particular sibling node occur before the other sibling node.

If the input document and edit script were not in document order, then multiple complete scans of the respective documents may have to be scanned. If the edit script is relatively small (e.g. only a few operations), then it is possible that the edit script would not have to be in document order. In that case, however, the first and subsequent node events would have to be compared against every operation event where each operation event is kept in memory. Else, the input document may have to be read once for each operation in the edit script.

Hardware Overview

Figure 7:
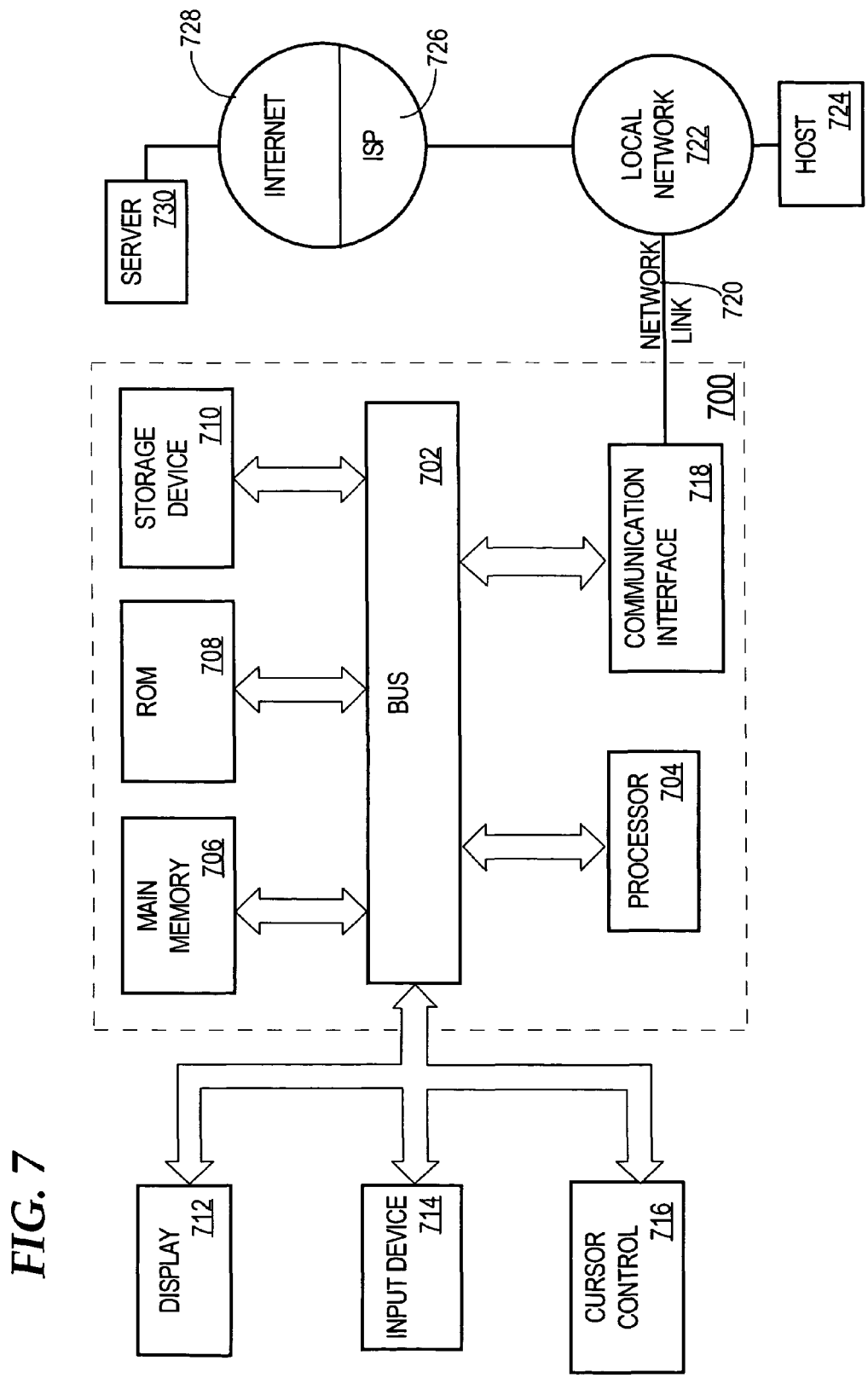
FIG. 7 is a block diagram of a system upon which the techniques described herein may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 700, various machine-readable media are involved, for example, in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 604.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense

What is claimed is:

1. A method for editing a hierarchically-organized input document, the method comprising the steps of:
   prior to editing the hierarchically-organized input document:
      generating a plurality of node events based on the hierarchically-organized input document by streaming one or more nodes of a plurality of nodes from the hierarchically-organized input document, and
      generating one or more operation events based on an edit script, wherein the edit script specifies a set of operations to perform on the hierarchically-organized input document; and
   editing the hierarchically-organized input document by performing one or more operations, corresponding to the one or more operation events, on one or more node events of the plurality of node events;
   wherein editing the hierarchically-organized input document comprises generating an output document that reflects a result of performing the one or more operations, corresponding to the one or more operation events, on the one or more node events of the plurality of node events;
   wherein the steps are performed by one or more computing devices.

2. The method of claim 1, wherein one or more nodes that are identified for one or more operations in the edit script are identified by the edit script using XPath notation.

3. The method of claim 2, further comprising maintaining state for correlating an XPath locator referenced in the one or more operation events to one or more nodes identified by the one or more node events by maintaining a stack that stores an XPath of the latest node event.

4. The method of claim 3, wherein:
   the one or more operations specify XPath notations that refer to the output document; and
   a delta table is maintained that reflects modifications by a subset of the one or more operation events that have occurred thus far.

5. The method of claim 1, further comprising:
   generating a current node event based on a first node in the input document;
   generating a current operation event based on a first operation of the set of operations;
   for each node event in the plurality of node events, determining whether the node identified by the current operation event is the same as the node identified by the current node event.

6. The method of claim 5, wherein the plurality of node events and the one or more operation events are generated by a pull parser.

7. One or more machine-readable storage media storing instructions which, when executed by one or more processors, causes:
   prior to editing a hierarchically-organized input document:
      generating a plurality of node events based on the hierarchically-organized input document by streaming one or more nodes of a plurality of nodes from the hierarchically-organized input document, and
      generating one or more operation events based on an edit script, wherein the edit script specifies a set of operations to perform on the hierarchically-organized input document;
   editing the hierarchically-organized input document by performing one or more operations, corresponding to one or more operation events, on one or more node events of the plurality of node events;
   wherein editing the hierarchically-organized input document comprises generating an output document that reflects the one or more operations, corresponding to the one or more operation events, on the one or more node events of the plurality of node events.

8. The one or more machine-readable storage media of claim 7, wherein one or more nodes that are identified for one or more operations in the edit script are identified by the edit script using XPath notation.

9. The one or more machine-readable storage media of claim 8, wherein the instructions include additional instructions which, when executed by one or more processors, further cause maintaining state for correlating an XPath locator referenced in the one or more operation events to one or more nodes identified by the one or more node events by maintaining a stack that stores an XPath of the latest node event.

10. The one or more machine-readable storage media of claim 9, wherein:
    the one or more operations specify XPath notations that refer to the output document; and
    a delta table is maintained that reflects modifications by a subset of the one or more operation events that have occurred thus far.

11. The one or more machine-readable storage media of claim 7, wherein the instructions include additional instructions which, when executed by one or more processors, further cause:
    generating a current node event based on a first node in the input document;
    generating a current operation event based on a first operation of the set of operations;
    for each node event in the plurality of node events, determining whether the node identified by the current operation event is the same as the node identified by the current node event.

12. The one or more machine-readable storage media of claim 11, wherein the plurality of node events and the one or more operation events are generated by a pull parser.

13. The method of claim 5, further comprising:
    in response to determining that the node identified by the current operation event is not the same as the node identified by the current node event, returning the current node event;
    wherein the node identified by the current node event is included in the output document.

14. The method of claim 5, further comprising:
    after determining that the node identified by the current operation event is the same as the node identified by the current node event, determining the operation that is specified by the current operation event; and
    in response to determining that the operation that is specified by the current operation event is a deletion, generating a new operation event from the edit script without returning the current node event;
    wherein the node that is identified by the current node event is not included in the output document.

15. The method of claim 5, further comprising:
after determining that the node identified by the current operation event is the same as the node identified by the current node event, determining the operation that is specified by the current operation event; and
in response to determining that the operation that is specified by the current operation event is an insertion and specifies a new node to be inserted, generating and returning a new event that is based on the new node;
wherein the new node is included in the output document.

16. The method of claim 5, further comprising:
after determining that the node identified by the current operation event is the same as the node identified by the current node event, determining the operation that is specified by the current operation event; and
in response to determining that the operation that is specified by the current operation event is an update operation, generating and returning a new node event that reflects the update specified in the current operation event;
wherein the node that is identified in the new node event is included in the output document.

17. The one or more machine-readable storage media of claim 11, wherein the instructions, when executed by the one or more processors, further cause:
in response to determining that the node identified by the current operation event is not the same as the node identified by the current node event, returning the current node event;
wherein the node identified by the current node event is included in the output document.

18. The one or more machine-readable storage media of claim 11, wherein the instructions, when executed by the one or more processors, further cause:
after determining that the node identified by the current operation event is the same as the node identified by the current node event, determining the operation that is specified by the current operation event; and
in response to determining that the operation that is specified by the current operation event is a deletion, generating a new operation event from the edit script without returning the current node event;
wherein the node that is identified by the current node event is not included in the output document.

19. The one or more machine-readable storage media of claim 11, wherein the instructions, when executed by the one or more processors, further cause:
after determining that the node identified by the current operation event is the same as the node identified by the current node event, determining the operation that is specified by the current operation event; and
in response to determining that the operation that is specified by the current operation event is an insertion and specifies a new node to be inserted, generating and returning a new node event that is based on the new node;
wherein the new node is included in the output document.

20. The one or more machine-readable storage media of claim 11, wherein the instructions, when executed by the one or more processors, further cause:
after determining that the node identified by the current operation event is the same as the node identified by the current node event, determining the operation that is specified by the current operation event; and
in response to determining that the operation that is specified by the current operation event is an update operation, generating and returning a new node event that reflects the update specified in the current operation event;
wherein the node that is identified in the new node event is included in the output document.

* * * * *

UNITED STATES PATENT AND TRADEMARK OFFICE
CERTIFICATE OF CORRECTION

| | | |
|---|---|---|
| PATENT NO. | : 8,082,493 B2 | |
| APPLICATION NO. | : 11/401609 | |
| DATED | : December 20, 2011 | |
| INVENTOR(S) | : Sthanikam et al. | |

It is certified that error appears in the above-identified patent and that said Letters Patent is hereby corrected as shown below:

In column 1, line 18, delete "(extensible" and insert -- (eXtensible --, therefor.

Signed and Sealed this
Twenty-seventh Day of March, 2012

David J. Kappos
*Director of the United States Patent and Trademark Office*